US00H002129H

(19) United States

(12) Statutory Invention Registration

Magyar et al.

(10) Reg. No.: US H2129 H

(43) Published: Nov. 1, 2005

(54) DISC RECLINER ASSEMBLY WITH FOLD-FLAT LATCH LINK MECHANISM

(75) Inventors: Joseph J. Magyar, deceased, late of Fenton, MI (US); by Mary E. Harokopas, legal representative, McKinney, TX (US); Joseph Landis, Macomb, MI (US); Stephen P. Tokarz, New Boston, MI (US)

(73) Assignee: Intier Automotive Inc., Aurora (CA)

(21) Appl. No.: 09/924,806

(22) Filed: Apr. 1, 2002

(65) Prior Publication Data

US 2002/0135215 A1 Sep. 26, 2002

(51) Int. Cl.[7] ..... B60N 2/20

(52) U.S. Cl. ..... 297/362.12; 297/378.12

(58) Field of Search ..... 297/362.12, 378.12, 297/378.11, 378.13

(56) References Cited

U.S. PATENT DOCUMENTS

| | | | | | |
|---|---|---|---|---|---|
| 5,536,069 | A | * | 7/1996 | Bray et al. | 297/378.12 X |
| 5,788,330 | A | * | 8/1998 | Ryan | 297/378.12 X |
| 5,857,746 | A | * | 1/1999 | Barrere et al. | 297/378.12 X |
| 5,904,403 | A | * | 5/1999 | Unckrich | 297/378.12 X |
| 5,951,108 | A | * | 9/1999 | Bauer et al. | 297/378.12 |
| 6,076,890 | A | * | 6/2000 | Yoshida et al. | 297/378.12 |
| 6,149,235 | A | * | 11/2000 | Fahim | 297/378.12 X |
| 6,164,720 | A | * | 12/2000 | Haglund | 297/378.12 X |
| 6,328,381 | B1 | * | 12/2001 | Smuk | 297/378.12 X |
| 6,402,249 | B1 | * | 6/2002 | Rohee et al. | 297/378.12 X |
| 6,454,355 | B2 | * | 9/2002 | Biletskiy | 297/378.12 |
| 6,464,299 | B1 | * | 10/2002 | Castagna | 297/378.12 |
| 2002/0125757 | A1 | * | 9/2002 | LeTournoux | 297/378.12 |

FOREIGN PATENT DOCUMENTS

| | | | | | |
|---|---|---|---|---|---|
| DE | 43 26 623 | A1 | * | 2/1995 | 297/378.12 |
| JP | 404183411 | A | * | 6/1992 | 297/378.12 |

* cited by examiner

*Primary Examiner*—Rodney B. White

(57) ABSTRACT

A recliner assembly allows adjustment of the seat back relative to the seat cushion between a plurality of reclined seating positions and further allows the seat back to move from a seating position to a fowardly folded-flat position and back to the original seating position. The recliner assembly comprises a seat back bracket rotatably assembled to a seat cushion bracket. The seat back bracket is fixedly attached to the seat back. The cushion bracket is fixedly attached to the seat cushion. The recliner assembly further includes a disc recliner having an outer disc rotatably assembled to and releasably lockingly engaged with an inner disc. The inner disc is fixedly attached to the seat cushion bracket. A shaft rotatably journalized to the outer and inner discs is moveable from an unreleased position to a released position, whereby the outer disc is released from locking engagement with the inner disc. A latch link having first and second ends is pivotally mounted at its first end to the outer disc. The second end of the latch link is defined by a cam surface. A slot is formed in the latch link adjacent to the cam surface. A striker pin outwardly extends from the seat back bracket. The striker pin is rotatably held by and releasable from latching engagement with the slot formed in the latch link. A biasing member biases the slot formed in the latch link against the striker pin of the seat back bracket.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG -1
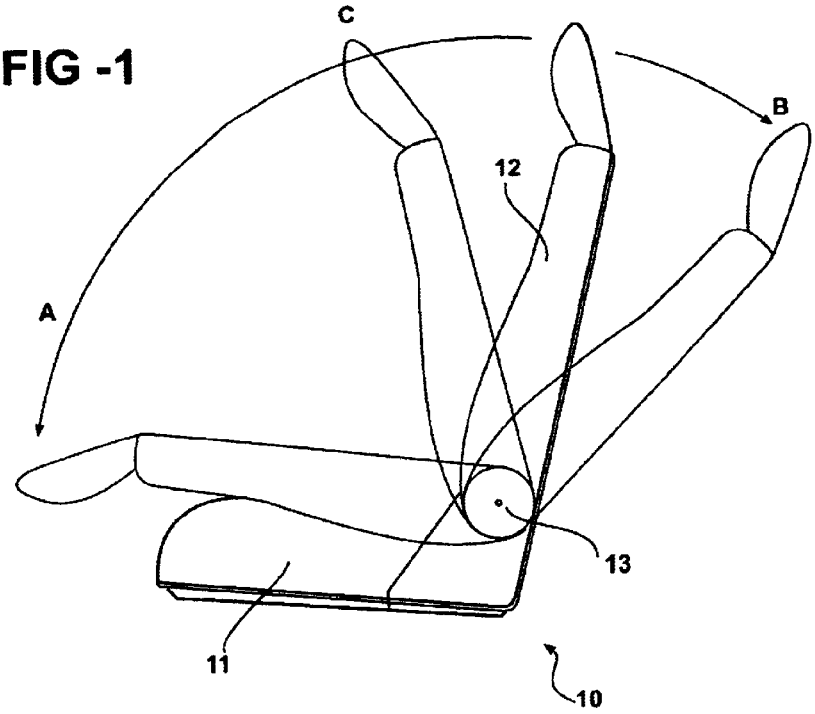
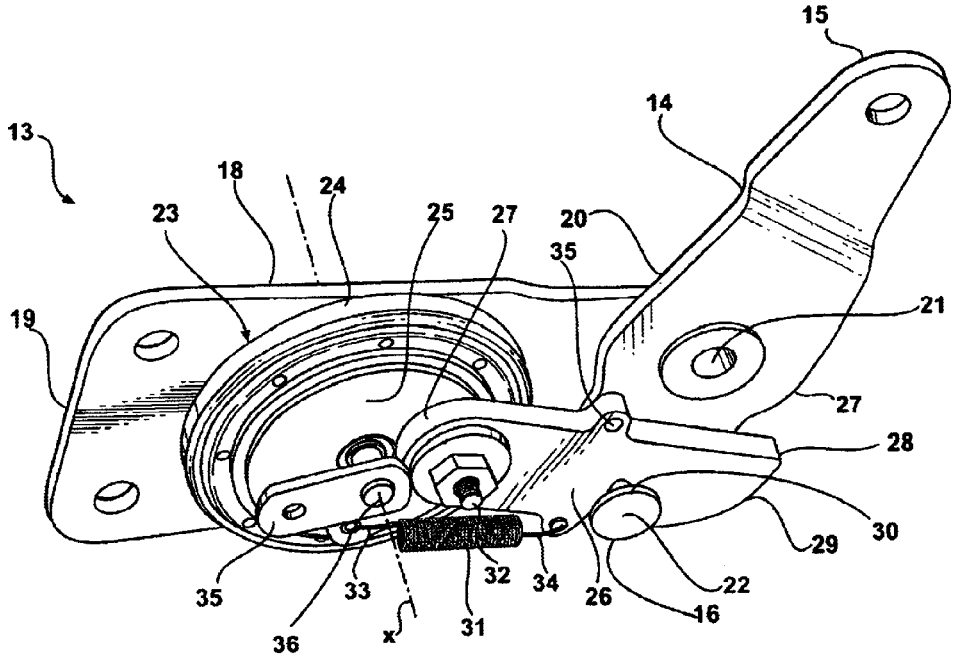
FIG - 2

DISC RECLINER ASSEMBLY WITH FOLD-FLAT LATCH LINK MECHANISM

BACKGROUND OF THE INVENTION

1. Field of the Invention

The subject invention relates to a recliner assembly used in automobile seats for adjustment of a seat back relative to a seat cushion.

2. Description of the Prior Art

Automotive vehicles include vehicle seat assemblies for supporting a seated occupant in the vehicle. A typical seat assembly includes a generally horizontal seat cushion and a seat back pivotally connected to the seat cushion by a recliner assembly. The recliner assembly provides for adjustment of the seat back relative to the seat cushion between a plurality of reclined positions. In addition, the recliner assembly may also allow the seat back to be folded flat against the seat cushion.

Disc recliners are well known in the vehicle seating art and are commonly used to pivotally connect a seat back to a seat cushion. Disc recliners commonly include a fixed cylindrical inner disc fixedly secured to the seat cushion and an cylindrical outer disc fixedly secured to the seat back and rotatably coupled to the inner disc. Disc recliners further include a locking mechanism for maintaining the angular position of the seat back relative to the seat cushion. The locking mechanism typically comprises an annular rim of teeth on the outer disc and several pawls each with a plurality of teeth. The pawls are moveable in a radial direction between a locked position and an unlocked position. With the pawls in the locked position, the teeth on the pawls are interlocked with the rim of teeth on the outer disc, thus locking the angular position of the seat back relative to the seat cushion. When the pawls are moved from the locked position to the unlocked position, the teeth on the pawls are no longer interlocked with the rim of teeth on the outer disc, thus allowing adjustment of the seat back relative to the seat cushion.

It is often desirable to have a vehicle seat with a seat back that is moveable from any of a plurality of reclined positions to a forwardly folded-flat position for extending the cargo carrying capacity of the vehicle. Disc recliners known in the art may be adapted to allow the seat back to be forwardly adjusted to the folded-flat position. However, such adaptations generally result in limiting the range in which the seat back is allowed to recline. Further, it is often desirable to have a vehicle seat with a seat back that is moveable from the forwardly folded-flat position back to a reclined position as determined just prior to placing the seat back in the forwardly folded-flat position. However, disc recliners known in the art typically require the seat back to be returned from the forwardly folded-flat position back to a default, generally upright, position.

Accordingly, there is a need for a seat assembly having a recliner assembly that allows pivotal adjustment of a seat back relative to a seat cushion between a plurality of reclined positions and allows the seat back to be adjusted from any one of the plurality of reclined positions to a fowardly folded-flat position, and from the forwardly folded-flat position to a reclined position as determined at the time the seat back is moved to the forwardly folded-flat position.

SUMMARY OF THE INVENTION

This invention relates to a vehicle seat assembly having a seat cushion pivotally connected to a seat back by a recliner assembly. The recliner assembly includes a seat back bracket having an upper end, a lower end, and an intermediate region between the upper and lower ends. The upper end of the seat back bracket is fixed to the seat back. The recliner assembly further includes a seat cushion bracket having first and second ends. The first end of the seat cushion bracket is fixed to the seat cushion. The second end of the seat cushion bracket is pivotally connected to the intermediate region of the seat back bracket. An inner disc is fixedly assembled to the first end of the seat cushion bracket. An outer disc is rotatably assembled to the inner disc for releasable locking engagement with the inner disk. Both the inner disc and the outer disc have aligned center bores. A shaft having opposing first and second ends and defining a longitudinal axis is rotatably journalized to the center bores of both the inner disc and the outer disc. The shaft is moveable from an unreleased position to a released position for releasably locking the outer disc with the inner disc. The recliner assembly further includes a latch link having first and second ends. The first end of the latch link is pivotally mounted to the outer disc. The second end of the latch link is defined by a cam surface. A slot is formed in the latch link adjacent to the cam surface between the first and second ends of the latch link. A striker pin outwardly extends from the lower end of the seat back bracket. The striker pin is rotatably captured by and releasable from latching engagement with the slot of the latch link. Further, the recliner assembly includes a biasing member having first and second ends. The first end of the biasing member is fixedly attached to the outer disc. The second end of the biasing member is fixedly attached to the latch link for continuously biasing the slot of the latch link into latching engagement with the striker pin.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic side view of an automotive seat assembly according to this invention.

FIG. 2 is a perspective view of a recliner assembly of the seat assembly of FIG. 1.

DETAILED DESCRIPTION OF THE PREFERRED EMBODIMENT

A seat assembly for use in an automotive vehicle according to this invention is shown generally at 10 in FIG. 1. The seat assembly 10 includes a generally horizontal seat cushion 11 and a seat back 12. The seat cushion 11 and seat back 12 are pivotally connected by a recliner assembly 13 for movement of the seat back 12 between a plurality of reclined positions as shown between positions B and C in FIG. 1. Further, the recliner assembly 13 allows pivotal movement of the seat back 12 to a fowardly folded flat position, as shown at A in FIG. 1. Preferably, the seat back 12 is biased towards the forwardly folded flat position. Referring to FIG. 2, the recliner assembly 13 comprises a substantially flat seat back bracket 14 having an upper end 15, a lower end 16, and an intermediate region 17 extending between the upper and lower ends 15,16. The recliner assembly 13 also includes a substantially flat seat cushion bracket 18 having a first end 19 and a second end 20. The seat back bracket 14 is rotatably attached at its intermediate region 17 to the second end 20 of the cushion bracket 18 by any conventional means, such as by bolting or riveting, thus defining a pivot 21. The seat back bracket 14 further includes a striker pin 22 extending outwardly from the lower end 16.

The recliner assembly 13 further includes a disc recliner 23 having an inner disc 24, an outer disc 25 rotatably assembled to and lockingly engaged with the inner disc 24. Both the inner disc 24 and the outer disc 25 have aligned center bores. A shaft 26, having opposing first and second ends and defining a longitudinal axis X, is rotatably journalized to the center bores of both the inner disc 24 and the outer disc 25. The shaft 26 is moveable from an unreleased position to a released position for releasably locking the outer disc with the inner disc. Further detailed description and operation of the disc recliner 23 is fully set forth in co-pending PCT application CA 99/00653, published Feb. 10, 2000, which is incorporated herein by reference in its entirety. The shaft 26 is connected to a release handle 35 and is biased in an unreleased position such that the outer disc 25 is lockingly engaged with the inner disc 23. The inner disc 24 of the disc recliner 23 is fixedly attached to the first end 19 of the seat cushion bracket 18 by any suitable means, such as by bolting or welding. Additionally, the recliner assembly 13 includes a latch link 26 having a first end 27 and an opposite second end 28. The first end 27 is rotatably attached to the outer disc 25 about a pivot pin 32 extending outwardly from the outer disc 25. The second end 28 of the latch link 26 defines a cam surface 29. A slot 30 for receiving and rotatably holding the striker pin 22 is formed in the latch link 26 adjacent to the cam surface 29. A biasing member 31, having a first end 33 and a second end 34, biases the slot 30 into latching engagement with the striker pin 22. The first end 34 of the biasing member 31 is fixedly attached to the outer disc 25, and the second end 34 of the biasing member is attached to the latch link 26.

A release mechanism (not shown) is operably connected to an aperture 35 formed in the latch link 26 for rotating the latch link 26 against the biasing force of the biasing member 31. The release mechanism may be of any suitable type for effecting the rotation of the latch link 26. An example of a suitable release mechanism includes a mechanical link, such as a cable or rod, connected between the latch link 26 and a lever that is rotatably connected to the seat cushion 11 or seat back 12.

The seat cushion bracket 18 of the recliner assembly 13 is fixedly attached to the seat cushion 11 and the seat back bracket 14 of the recliner assembly 13 is fixedly attached to the seat back 12 by any suitable means, such as by bolting, riveting, or welding.

In operation, when the shaft 26 is in the biased, unreleased position, the disc recliner 23 is in a locked state with the outer disc 25 in locking engagement with the inner disc 24. Further, the biasing member 31 rotatably holds the striker pin 22 of the seat back bracket 14 within the notch 30 of the latch link 26. By this arrangement, the seat back 12 is fixed relative to the seat cushion 11.

To incrementally adjust the angle of the seat back 12 relative to the seat cushion 11 about the pivot 21, the disc recliner 23 is released from the locked state. Specifically, the shaft 26 is rotated from the biased, unreleased position by applying a rotational force to the release handle 35, which urges the outer disc 25 out of locking engagement with the inner disc 24. The angular position of the seat back 12 may then be adjusted clockwise towards a fully, rearwardly reclined position or counter clockwise towards a forwardly dumped position, as indicated at B and C, respectively, in FIG. 1. Such forward or rearward adjustments of the seat back 12 result in a generally opposite motion of the lower end 16 of the seat back bracket 14 and the latch link 26, and in turn results in rotation of the outer disc 25 relative to the inner disc 24.

Once the angle of the seat back 12 has been adjusted to a desired position, the disc recliner 23 is returned to the locked state by removing the rotational force on the handle 35 so as to allow the shaft 26 to return to the biased unreleased position, which in turn, allows the outer disc 25 to lockingly re-engage with the inner disc 24. When moving the seat back between the reclined positions, the seat back 12 is constrained by the latch link 26, which is rotatably held at its second end 28 by the striker pin 22 and rotatably attached at its first end 27 to the disc recliner 23 in the locked state.

To adjust the seat back 12 from a seated position to the forwardly folded-flat position, the latch link 26 is moved out of latching engagement with the seat back bracket 14. Specifically, as viewed in FIG. 2, the latch link 26 is rotated in a counterclockwise direction against the force of the biasing member 31 about the pivot 32 by actuation of the release mechanism to lift the notch 30 away from the striker pin 32. Once the notch 30 has cleared the striker pin 22, the lower end 16 is no longer constrained by the latch link 26, which is connected to the locked disc recliner 23. The seat back 12 is then allowed to rotate counter clockwise about the pivot 21 to the biased, forwardly folded flat position. The force applied to lift the latch link 26 may be removed to allow the biasing member 31 to recoil to an nontensioned state, pulling the latch link 26 clockwise just beyond the position it held while engaged with the striker pin 22. Further, the position of the outer disc 25 relative to the inner disc 24 is maintained with the locked disc recliner 23.

To return the seat back 12 from the forwardly folded flat position to the reclined position that the seat back 12 was adjusted to when the seat back was placed in the forwardly folded flat position, the seat back 12 is rotated clockwise about the pivot 21. As the seat back 12 is rotated clockwise towards its original seating position, the striker pin 22 at the lower end 16 of the seat back bracket 14 moves towards and eventually makes contact with the cam surface 29 of the second end 28 of the latch link 26. Once the striker pin 22 makes contact with the cam surface 29, further clockwise motion of the seat back 12 causes the latch link 26 to rotate counter clockwise against the force of the biasing member 31, as the striker pin 22 slides along the cam surface 29. Eventually, the striker pin 22 slides past the cam surface 29 and lockingly re-engages with the notch 30 of the latch link 26. Thus, the seat back 12 is pivotally constrained once the striker pin 22 re-engages with the notch 30. At this point, the seat back 12 may again be adjusted between a plurality of reclined positions or the forwardly folded-flat position as described above.

The invention has been described in an illustrative manner, and it is to be understood that the terminology, which has been used, is intended to be in the nature of words of description rather than of limitation.

Many modification and variations of the present invention are possible in light of the above teachings.

What is claimed is:

1. A recliner assembly for providing pivotal movement of a seat back relative to a seat cushion of an automotive vehicle seat, said recliner assembly comprising:

a seat back bracket having an upper end, a lower end, and an intermediate region extending therebetween, said upper end of said seat back bracket adapted to be fixedly attached to the seat back;

a seat cushion bracket having a first end and a second end, said second end pivotally connected to said intermediate region of said seat back bracket, said first end of said seat cushion bracket adapted to be fixedly attached to the seat cushion;

a disc recliner operatively coupled between said seat back bracket and said seat cushion bracket for allowing limited pivotal movement of the seat back relative to the seat cushion between a plurality of reclined seating positions in a released position and preventing movement thereof in an unreleased position;

a striker pin extending outwardly from said lower end of said seat back bracket;

a latch link having first and second ends, said first end of said latch link pivotally mounted to said disc recliner, said second end defined by a cam surface, said latch link having a slot formed adjacent to said cam surface disposed between said first and second ends of said latch link for receiving said striker pin and retaining the seat back in said reclined seating position;

said latch link being pivotal between a locked position wherein said striker pin is received and retained within said slot when the seat back is in said reclined seating position and an unlocked position releasing said striker pin from said slot for allowing pivotal movement of the seat back about the seat cushion while said disc recliner remains in said unreleased position; and a biasing member having first and second ends, said first end of said biasing member fixedly attached to said disc recliner, said second end of said biasing member fixedly attached to said latch link for continuously biasing said slot of said latch link into latching engagement with said striker pin at said lower end of said seat back bracket.

* * * * *